United States Patent

Argabright et al.

[15] 3,695,356
[45] Oct. 3, 1972

[54] PLUGGING OFF SOURCES OF WATER IN OIL RESERVOIRS

[72] Inventors: Perry A. Argabright, Sedalia, Colo. 80135; C. Travis Presley, Littleton, Colo. 80120; Harold C. Bixel, Denver, Colo. 80237

[73] Assignee: Marathon Oil Company, Findlay, Ohio

[22] Filed: Sept. 15, 1970

[21] Appl. No.: 72,288

[52] U.S. Cl. ................................166/295, 166/294
[51] Int. Cl. ..............................................E21b 33/138
[58] Field of Search ....................166/285, 292–295, 166/300; 260/77.5 NC, 248 NC

[56] References Cited

UNITED STATES PATENTS

| | | |
|---|---|---|
| 3,244,230 | 4/1966 | Sharp ........................ 166/292 |
| 2,782,857 | 2/1957 | Clark et al. ................ 166/293 |
| 2,206,389 | 7/1940 | Cannon ...................... 166/292 |
| 2,208,766 | 7/1940 | Lawton ...................... 166/292 |
| 2,784,787 | 3/1957 | Matthews et al. ....... 166/292 X |
| 2,858,892 | 11/1958 | Carpenter ................. 166/295 |
| 2,867,278 | 1/1959 | Mallory et al. ........... 166/295 |
| 2,940,729 | 6/1960 | Rakowitz .................. 166/295 |
| 3,181,611 | 5/1965 | Dollarhide ................ 166/295 |
| 3,573,259 | 3/1971 | Argabright et al. ....... 260/77.5 NC |

*Primary Examiner*—Stephen J. Novosad
*Attorney*—Joseph C. Herring and Richard C. Willson

[57] ABSTRACT

Water-oil ratio in production operations can be reduced by selectively plugging off sources of water within the formation by injecting solutions of chemicals which precipitate at a controlled rate, e.g., aqueous solutions of isocyanuric salts which hydrolyze.

12 Claims, 7 Drawing Figures

INVENTORS
P. A. ARGABRIGHT
C. T. PRESLEY
A. C. BIXEL

ATTORNEY

INVENTOR
P. A. ARGABRIGHT
C. T. PRESLEY
H. C. BIXEL (M = 0 and N = 14; X = K and R' = CH₃)

(M = 0 and N = 2; X = Na and R' = C₂H₅ = CH₃CH₂−)

*INVENTOR*
P. A. ARGABRIGHT
C. T. PRESLEY
H. C. BIXEL

PLUGGING OFF SOURCES OF WATER IN OIL RESERVOIRS

CROSS REFERENCES TO RELATED APPLICATIONS

The following U.S. patent applications relate to the general field of the invention: Ser. No. 89,883 filed 11-16-70; Ser. No. 72,388, filed 9-15-70; Ser. No. 111,422, filed 2-1-71; Ser. No. 715,199 filed Mar. 22, 1968, now U.S. Pat. No. 3,573,259; Ser. No. 682,545 filed Nov. 13, 1967, now abandoned; Ser. No. 715,182 filed Mar. 22, 1968, now abandoned; and Ser. No. 682,576 filed Nov. 13, 1967, now U.S. Pat. No. 3,549,630.

BACKGROUND OF THE INVENTION

1. Field of the Invention

The present invention relates to the field of petroleum recovery as classified in class 166 of the United States Patent Office entitled, "Wells," particularly in subclasses; -285 ("Cementing, plugging or consolidating"), —294 ("Cement or consolidating material is organic . . ."), —295 ("Organic material — resinous"), and -306 ("Fluid enters and leaves well at spaced zones").

2. Description of the Prior Art

Various processes have been utilized for plugging and sealing subterranean formations, including those of U.S. Pat. No. 2,800,184 which temporarily plugs oil-bearing strata with specific surface active materials, then permanently plugs more permeable strata with cement or other permanent plugging agent, then removes the temporary plug and recovers oil; U.S. Pat. No. 2,889,883 which seals porous underground formations with aromatic polyisocyanates or urethane derivatives, a specific catalytic phenol and an organic solvent which form an infusible resin in from 20 minutes to about 24 hours; U.S. Pat. No. 3,199,590 which consolidates incompetent sands with curable consolidating fluids, e.g., furfuryl alcohol and derived resins, then introducing an oil-overflush solution immiscible with the consolidating fluid and containing a quantity of catalysts for curing the consolidating fluid in the formation; U.S. Pat. No. 3,116,264 which teaches cementing compositions of water, hydraulic cement and maleic anhydride-vinyl nitrogen-containing ring compound copolymer as a slurry for cementing wells; U.S. Pat. No. 3,181,612 which utilizes a particularly dry water-soluble polyurethane polymer injected into the formation at fracturing pressure where it contacts intruding water which causes it to swell. Other plugging agents include thermo setting resins, gums, silica gel, etc. Less related is U.S. Pat. No. 2,899,330 which stabilizes soil with alkenyl polyamines.

Methods for preventing or minimizing water coning are discussed in U.S. Pat. No. 3,497,011 which circulates viscous fluids through a zone.

SUMMARY

General Statement of the Invention

None of the aforementioned literature teaches a controlled rate of precipitation of compounds from water solution with the advantage of controlled permeability reduction.

The present invention permits controlled timing of precipitation over a period of from a few minutes to many days allowing for ease of placement of the plugging solution into the formation at the points desired. The present invention can reduce high permeability of a formation to a permeability of less than one millidarcy. According to the invention, aqueous solutions of molecules containing isocyanurate rings, more preferably containing isocyanuric acid groups and their derivatives, are adjusted in concentration and in pH so as to provide the desired rate of precipitation in view of the temperature prevailing in the formation and other factors. These materials then precipitate, plugging the formation. By adjusting concentration and/or by moving the solutions of the invention through the formation during the precipitation phase it is possible to cause partial plugging of the formation without completing blocking the formation.

Utility of the invention

The present invention is useful in alleviating the wide variety of problems encountered when a single well communicates both with a body of oil and with a body of water, gas or other fluid. The invention, by blocking off, at least to a large extent, the flow of the second fluid into the well, permits the production of hydrocarbons without excessive amounts of the second fluid. The invention is useful for the controlling of water-coning or gas-coning in formations having oil-bearing zones in communication with water-bearing or gas-bearing zones. This invention may also be used to prevent or reduce water or gas from intruding into the oil production well due to zonation.

DESCRIPTION OF THE PREFERRED EMBODIMENTS

Starting Materials

Figure 1A:
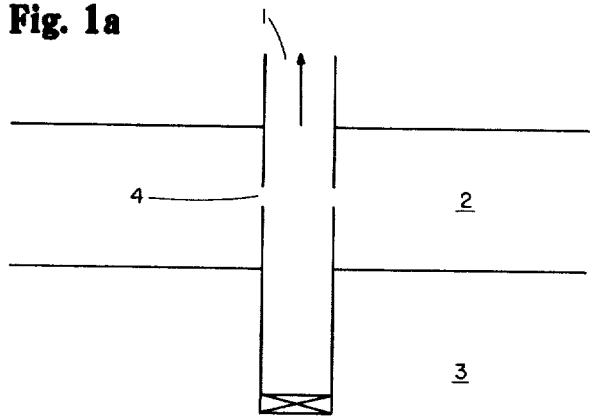
FIGS. 1a through 1c are schematic representations of the treatment of a formation according to the invention.

The plugging materials for use in the present invention are water-soluble materials, preferably compounds containing isocyanurate rings which gradually react to form precipitates, preferably aqueous solutions of compounds containing isocyanuric acid rings or their derivatives and most preferably polyisocyanurate compounds having the structure:

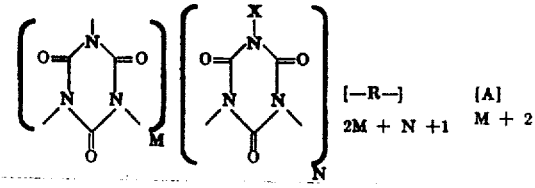

where
R = divalent radical
x = a metal (e.g. Na, K, Li) or hydrogen, quaternary ammonium, or a combination thereof
A = a monovalent group selected from the following: isocyanate, urethane (NHCO$_2$R'), urea, amino
R' = monovalent radical
M = average number of trisubstituted isocyanurate rings N = average number of isocyanuric acid and/or isocyanurate salt groups 2M + N + 1 = average number of divalent R groups M + 2 = average number of A groups wherein R preferably contains two to 40, more preferably two to 30, and most preferably four to 18 carbon atoms; R' preferably contains one to 40, more preferably one to 20, and most preferably one to 10, and wherein there are no N-to-N bonds and no A-to-N bonds, and no A-to-A-bonds, and no R-to-R bonds.

Specific examples of especially preferred compounds are shown in FIGS. 2–5.

Preferably the plugging agents will be present in the aqueous solutions in concentrations of about 0.01 to about 85, more preferably 0.10 to 50, and most preferably 0.25 to 25 weight percent. The viscosity of the aqueous solutions will be low enough to be injectable and will preferably be in the range of from about 0.1 to about 500, more preferably from about 0.25 to about 100, and most preferably from 0.50 to about 50 centipoises. While not necessary to the practice of the present invention, auxiliary agents, e.g., flocculating agents, other salts, polyacrylamides or other polymers or other thickening agents may be added to the aqueous solutions if desired for the particular application.

The preferred isocyanurate ring-containing compounds can be produced according to the methods of Canadian Patent No. 831,994 granted Jan. 13, 1970 to Argabright, DePuy and Phillips. The most preferred polyisocyanuric acid derivatives having the structure drawn above can be prepared according to the techniques of West German application 1,816,521 which is a counterpart of copending United States patent application Ser. No. 715,199 filed Mar. 22, 1968, now U.S. Pat. No. 3,573,259.

The water used to form the aqueous solutions of the present invention can be fresh water or saline waters e.g., Palestine lime water.

FIGS. 2 through 5 show the structure of certain preferred precipitates of the present invention.

pH Control

In utilizing the preferred isocyanuric acids and derivatives, the precipitation occurs by a controlled hydrolysis of these compounds to form water-insoluble precipitates. The desired degree of plugging of the pores of the formation and the placement of the plugged zone within the desired portion of the reservoir, are accomplished by controlling the rate both of precipitation and amount of precipitate. This rate of hydrolysis is related to the pH of the solution at the time of injection. Having selected the rate of injection and the concentration, and knowing the temperature in the zone to be plugged, the optimum pH can be chosen by routine laboratory runs. In general, the higher the pH, the faster the hydrolysis and subsequent precipitation. In general, the pH will be in the range of from 4 to about 15, more preferably from about 6 to 15, and most preferably from about 8 to about 15 with the exact pH of the injection being selected so as to cause precipitation at the rate desired under the particular circumstances.

Formation Permeability

In general, the permeability of the formation before treatment will range from about 0.001 to about 30,000, more preferably from 0.5 to about 10,000, and most preferably from 0.2 to about 5,000 millidarcies. After treatment, the permeability may range from 0.0001 to about 25,000, more commonly 500 to about 0.01. In general, any formations having undesirably high permeability can be advantageously treated by the invention.

Placement Techniques

A wide variety of techniques, including those previously employed with conventional plugging agents, may be utilized to place the aqueous solutions of the present invention into the portion of the formation which is to be plugged, (e.g., simple injection, formation packets, hydraulic fracturing, etc.).

Examples

EXAMPLE I

Preparation of Polyisocyanurate Salt

A 2,000 ml four-necked glass reactor equipped with a motor driven stirrer, reflux condenser, thermometer and adapter for introducing liquid is charged with 43.3 g of potassium cyanate (0.53 mole) and 1,000 ml of anhydrous dimethylformamide (DMF). To the resulting slurry at 75°C., 71 ml of tolylene diisocyanate (0.50 mole) is added dropwise at a rate of 0.428 ml/min. by means of a motor-driven syringe pump. After the addition was complete, the mixture was allowed to react an additional 10 min., cooled to 60°C., 100 ml of methanol added and the temperature permitted to drop to 23°C. The desired product was collected by filtration of the crude reaction mixture, extracted with acetone in a Soxhlet apparatus and dried to give 130.4 g of a pale yellow powder.

The product is water-soluble but relatively insoluble in hydrocarbon solvents.

The ratio of aromatic rings to end groups

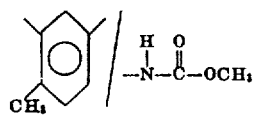

is measured by nuclear magnetic resonance (N.M.R.) (in $D_2O$) to be 12.8. This corresponds to a minimum average molecular weight of 6,500.

EXAMPLE II – III

Reduction in permeability of sandstone

A sample of fired Berea sandstone having a cylindrical shape 3 inches in diameter and 2 feet in length is chosen as a model porous medium. Two different pressure taps are installed in the core, pressure tap A is installed near the entrance end and pressure tap B is located near the mid-point. The initial permeability to the flow of 1.8% NaCl solution is determined as the average of the permeability values obtained at selected flow rates. An initial permeability of 144 millidarcies (md) was measured at pressure tap A, whereas B indicated a permeability of 119 md.

At this point a 3 percent aqueous solution of the compounds prepared in Example I, in 1 M NaOH is injected into the core, displacing the NaCl solution. The total amount of this aqueous solution injected is approximately 1.2 pore volumes. This fluid is then allowed to remain in the core for roughly 40 hours. After this time the permeability of the core is redetermined with 1.8 percent NaCl solution. The experimental results were as follows:

| Example | $K_{initial}$, md | $K_{final}$, md | $K_{final}/K_{initial}$ | Pressure Tap |
|---|---|---|---|---|
| II | 144 | 1.6 | 0.011 | A |
| III | 119 | 1.2 | 0.010 | B |

EXAMPLE IV – VI

Reduction in permeability of more permeable sandstone.

In this example, the porous media is again a fired 2 foot by 3 inch diameter Berea sandstone. However, it is chosen to have a higher permeability than the material used in Example II. In this experiment, three different pressure taps are placed in the core sample. Pressure tap A is positioned near the inlet and pressure tap B is positioned at the mid-point and pressure tap C is positioned near the outlet end. The permeabilities are again determined and various flow rates using 1.8 percent NaCl solution. Again, 1.2 pore volumes of a 3 percent solution of the compound prepared in Example I in 1 M NaOH is injected into the core. This aqueous solution remains in the core for approximately 65 hours. Permeabilities are then redetermined with 1.8 percent NaCl solution. The experimental results were as follows:

| Example | $K_{initial}$, md | $K_{final}$, md | $K_{final}/K_{initial}$ | Pressure Tap |
|---|---|---|---|---|
| IV | 712 | 2.6 | 0.0036 | A |
| V | 689 | 2.5 | 0.0037 | B |
| VI | 587 | 2.1 | 0.0036 | C |

EXAMPLE VII – IX

In order to demonstrate that the partial plugging process is to some degree reversible, 1.5 pore volumes of acetone are then pumped through the sandstone core plugged as described in Examples IV, V, and VI. The permeabilities are then redetermined by 1.8 percent NaCl solution. Experimental results were as follows:

| Example | $K_{flushed}$, md | % of $K_{final}$ | Pressure Tap |
|---|---|---|---|
| VII | 18.0 | 690 | A |
| VIII | 6.0 | 240 | B |
| IX | 5.4 | 260 | C |

EXAMPLE X

Referring to FIG. 1a a production well 1 extends downward through an oil-bearing zone 2 and a water-bearing zone 3. The well-bore has perforations 4 which permit it to withdraw oil from approximately the mid-point of the oil-bearing zone 2. However, when the rate of production is increased, "water coning" occurs with water from zone 3 being pulled upward until it enters the perforations 4, thus reducing the percentage oil in the production from well 1. To permit high production rates from the well while minimizing water coning, it is necessary to block the water zone 3 from the oil zone 2 at least in the area near to the well-bore.

Figure 1B:
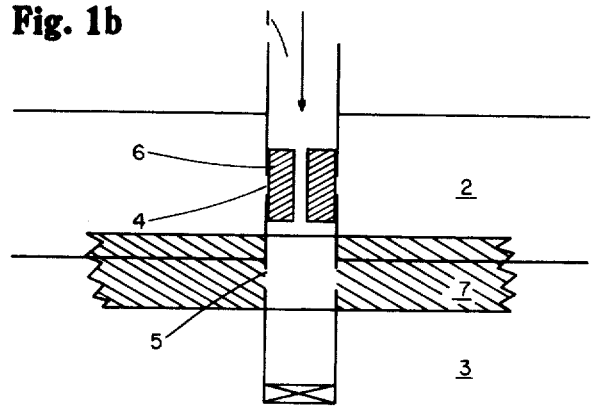

Referring to FIG. 1b, a cylindrical packet 6 is placed to block perforations 4 while allowing flow down through the well-bore 1 to a new set of perforations 5 communicating with the water-bearing zone 3.

An aqueous solution (1 M. in NaOH) containing 5 percent by weight of the compound produced in Example I is injected into well-bore 1 and flows out through perforations 5 displacing water from a cylindrical area within zone 3. Following injection, the well is shut in for 1 to 10 days. After this time, precipitation of the hydrolyzed derivatives from the aqueous solution is substantially complete and the permeability of zone 7 is substantially reduced.

Figure 1C:
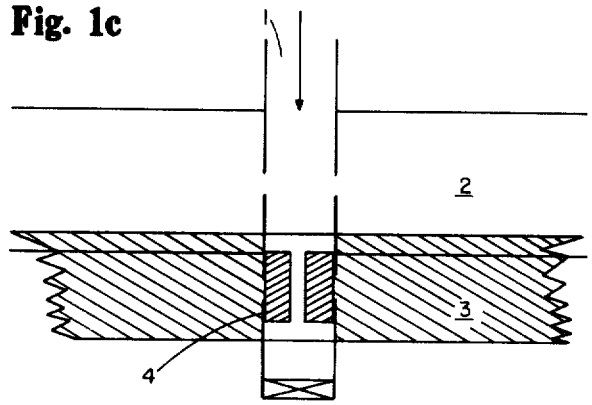
Figure 2:
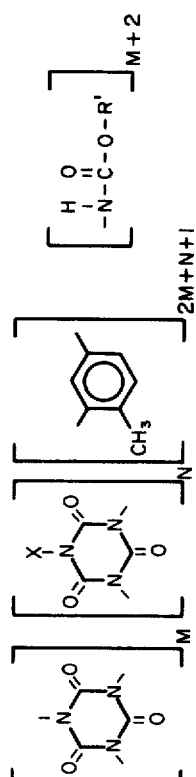
FIGS. 2-5 are structural representations of certain preferred precipitates of the invention.
Figure 2:
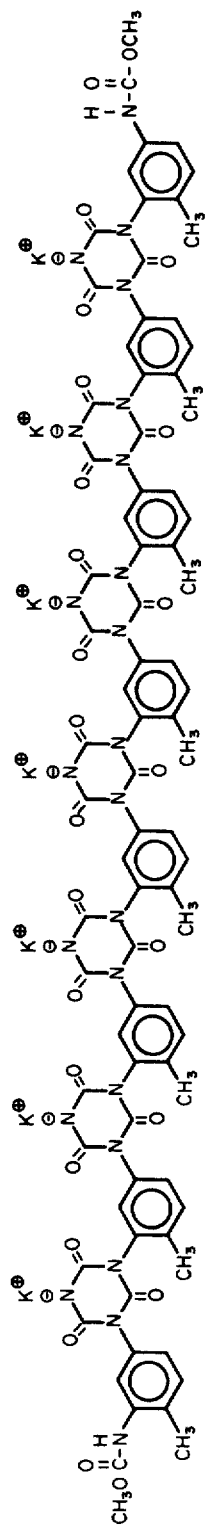
Figure 3:
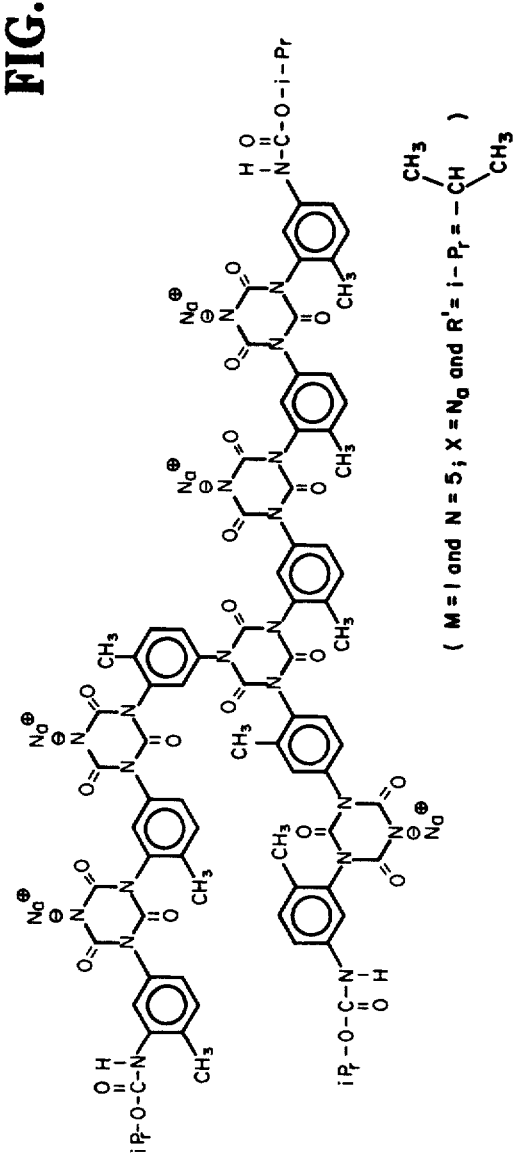
Figure 4:
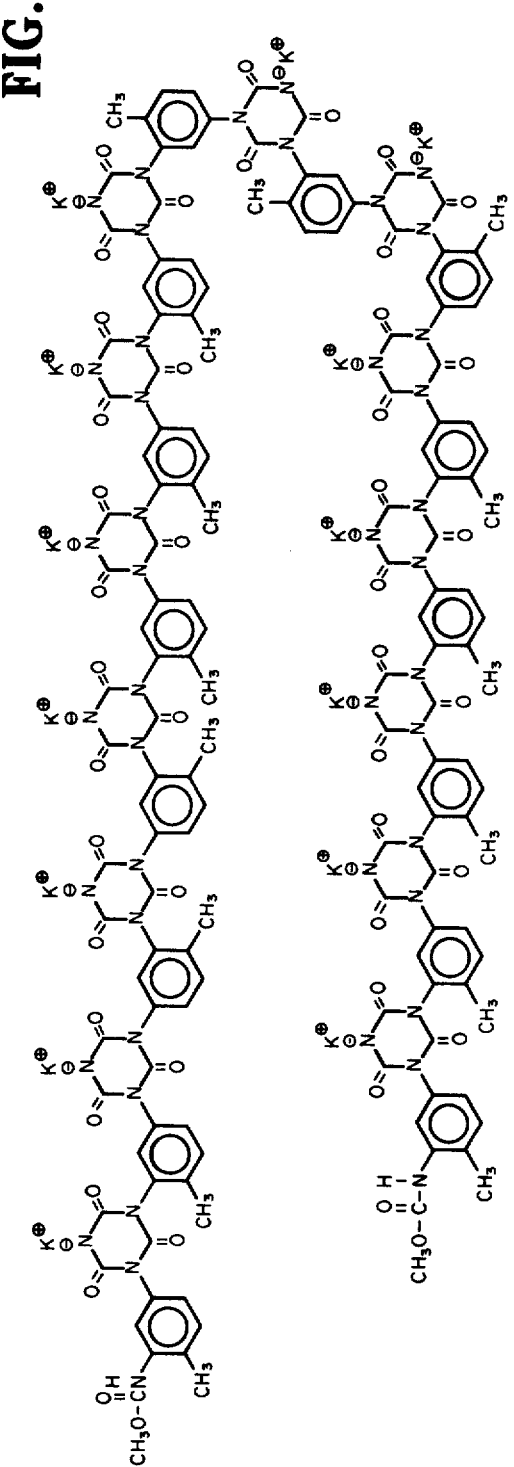
Figure 5:
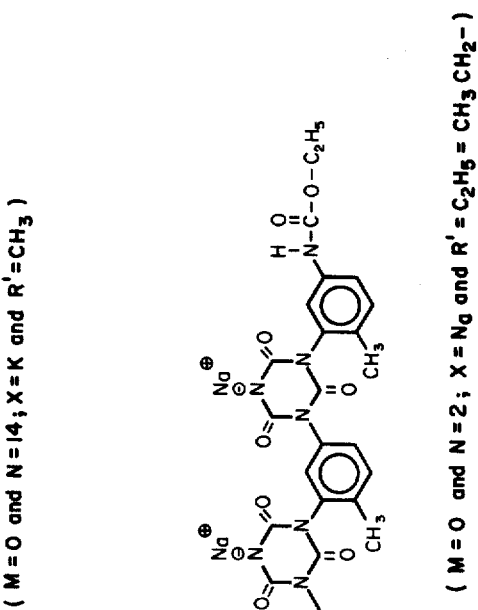

Referring to FIG. 1c, packer 6 is moved to unblock perforations 4 communicating with the oil-bearing zone and to block perforations 5 communicating with the water-bearing zone. Production is thereafter resumed with an appreciable reduction in water coning even at production rates in excess of those at which water coning had been observed previously.

Modifications of the Invention

It should be understood that the invention is capable of a variety of modifications and variations which will be made apparent to those skilled in the art by a reading of the specification. For example, the invention can be practiced in gas wells.

What is claimed is:

1. In a process for the alleviation of water or gas coning in which fluids from a proximate fluid-bearing zone are drawn into a production well communicating with a petroleum-bearing zone so as to deleteriously contaminate the produced oil with fluids from said proximate zone, the improvement comprising injecting into the formation an aqueous solution of compounds which hydrolyze to precipitate over a pH-dependent time period to form a mass of precipitate within the formation, adjusting pH of said aqueous solution to control the time of occurrence of said precipitation so as to form said mass within said formation between at least a portion of said fluid-bearing zone and said petroleum-bearing zone, said precipitate forming a barrier which reduces flow from said fluid-bearing zone into said production well.

2. The process of claim 1 wherein the aqueous solution comprises isocyanurate derivatives having the structure:

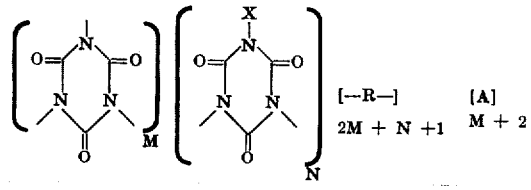

where
R = divalent radical
X = a metal (e.g., Na, K, Li), hydrogen, quaternary ammonium or a combination thereof,
A = monovalent group selected from the following: isocyanate, urethane, urea, amino, $NH_2CO_2R'$,
R' = monovalent radical
M = average number of trisubstituted isocyanurate rings
N = average number of isocyanuric acid or derivative rings
2M + N + 1 = average number of divalent R groups
M + 2 = average number of A groups.

3. The process of claim 2 wherein the aqueous solution has a pH in the range of from about 8 to about 15.

4. In a process for the alleviation of water or gas coning in which fluids from a proximate fluid-bearing zone are drawn into a production well communicating with a petroleum-bearing zone so as to deleteriously contaminate the produced oil with fluids from said proximate zone, the improvement comprising injecting into the formation an aqueous solution of compounds which precipitate over a time period to form a mass of precipitate within the formation, said mass lying between at least a portion of said fluid-bearing zone and said petroleum-bearing zone, said precipitate forming a barrier which reduces flow from said fluid-bearing zone into said production well, wherein the aqueous solution comprises an isocyanuric acid or its derivatives.

5. In a a process for reducing the flow of fluids from a fluid-bearing zone into an oil production well communicating with a petroleum-bearing zone, the improvement comprising in combination the steps of:
   a. temporarily blocking the point at which said well communicates with said petroleum-bearing zone,
   b. opening a point of communication at which said well communicates with at least a portion of said petroleum-bearing zone and at least a portion of said fluid-bearing zone,
   c. injecting into the formation through said point of communication at a point substantially between said portion of said fluid-bearing zone and said portion of said petroleum-bearing zone, a water solution of compounds which gradually hydrolyze to precipitate over a pH-dependent time period, the pH of said water solution being adjusted to control the time of said precipitation so as to form a mass of precipitate which reduces the permeability of the portion of the formation in which said mass is located,
   d. closing said point of communication at which said well communicates with said petroleum-bearing zone and said fluid-bearing zone,
   e. reopening the point of communication of said well with said petroleum-bearing zone,
   f. producing oil from said well.

6. The process of claim 5 wherein the aqueous solution comprises an isocyanuric acid or its derivatives.

7. The process of claim 5 wherein the aqueous solution comprises isocyanurate derivatives having the structure:

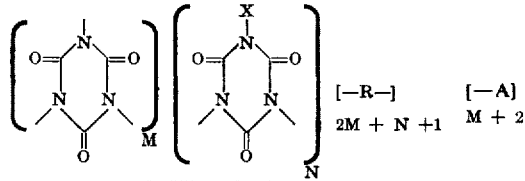

R = divalent radical
X = a metal (e.g., Na, K, Li), hydrogen, quaternary ammonium, or a combination thereof,
A = monovalent group selected from the following isocyanate, urethane, urea, amino, $NH_2CO_2R'$
R' = monovalent radical
M = average number of trisubstituted isocyanurate rings
N = average number of isocyanuric acid or derivative rings
$2M + N + 1$ = average number of divalent R groups
$M + 2$ = average number of A groups.

8. The process of claim 7 wherein the aqueous solution has a pH in the range of from about 8 to about 15.

9. A process for reducing water influx into petroleum-producing wells due to reservoir zonation, said process comprising injecting into the water-producing zone an aqueous solution of compounds which hydrolyze to precipitate after a pH-dependent time period to form a mass of precipitate within the formation, adjusting the pH of said aqueous solution to control the time of said precipitate so as to form said mass within said water producing zone, reducing fluid flow through the water-producing zone.

10. The process of claim 9 wherein the producing well is a gas well.

11. The process of claim 9 wherein the petroleum producing well is an oil producing well.

12. The process of injecting into a subterranean formation an aqueous solution comprising isocyanurate derivatives having the structure:

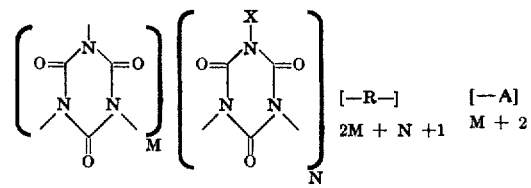

where
R = divalent radical
X = a metal (e.g., Na, K, Li), hydrogen, quaternary ammonium or a combination thereof,
A = monovalent group selected from the following: isocyanate, urethane, urea, amino, $NH_2CO_2R'$,
R' = monovalent radical
M = average number of trisubstituted isocyanurate rings
N = average number of isocyanuric acid or derivative rings
$2M + N + 1$ = average number of divalent R groups
$M + 2$ = average number of A groups.

* * * * *